(12) United States Patent
Pezzuoli et al.

(10) Patent No.: US 12,515,221 B2
(45) Date of Patent: Jan. 6, 2026

(54) MODULAR LAB-ON-A-CHIP DEVICE FOR THE ANALYSIS OF FLUIDS

(71) Applicant: Sanchip Societa' A Responsabilita' Limitata, Capannori (IT)

(72) Inventors: Denise Pezzuoli, Capannori (IT); Marco Cozzolino, Capannori (IT)

(73) Assignee: SANCHIP SOCIETA' A RESPONSABILITA' LIMITATA, Capannori (IT)

( * ) Notice: Subject to any disclaimer, the term of this patent is extended or adjusted under 35 U.S.C. 154(b) by 193 days.

(21) Appl. No.: 18/283,733

(22) PCT Filed: Mar. 23, 2022

(86) PCT No.: PCT/IB2022/052638
§ 371 (c)(1),
(2) Date: Sep. 22, 2023

(87) PCT Pub. No.: WO2022/201048
PCT Pub. Date: Sep. 29, 2022

(65) Prior Publication Data
US 2024/0299937 A1 Sep. 12, 2024

(30) Foreign Application Priority Data

Mar. 23, 2021 (IT) .................... 102021000006980

(51) Int. Cl.
G01N 31/10 (2006.01)
B01L 3/00 (2006.01)
G01N 21/85 (2006.01)

(52) U.S. Cl.
CPC ........ B01L 3/502715 (2013.01); G01N 21/85 (2013.01); B01L 2200/027 (2013.01);
(Continued)

(58) Field of Classification Search
CPC ......... B01L 3/502715; B01L 2200/027; B01L 2200/028; B01L 2200/10;
(Continued)

(56) References Cited

U.S. PATENT DOCUMENTS 6,536,477 B1* 3/2003 O'Connor ............. B01L 3/5027
137/833
11,618,018 B2* 4/2023 Lee ....................... B01L 3/5027
422/503

(Continued)

FOREIGN PATENT DOCUMENTS

EP 3778026 A1 2/2021

OTHER PUBLICATIONS

PCT International Search Report and Written Opinion dated Aug. 19, 2022 for PCT Application No. PCT/IB2022/052638.
(Continued)

Primary Examiner — Rebecca C Bryant
(74) Attorney, Agent, or Firm — McCarter & English, LLP

(57) ABSTRACT

A modular lab-on-a-chip device for the analysis of a fluid including at least a base module, an end module and one or more analysis modules is described. Each module includes a respective first conduit and a respective second conduit. The first conduits define at least partially a first portion and the second conduits define at least partially a second portion of a fluidic channel. The end module includes a connecting conduit connecting the first portion and the second portion of the fluidic conduit to each other; and each analysis module includes a respective analysis conduit in fluidic connection with the respective first conduit and a sensor unit configured to determine at least one characteristic of the fluid and/or components present in the fluid when the fluid is present, in use, in the analysis conduit.

16 Claims, 11 Drawing Sheets

(52) U.S. Cl.
CPC ..... *B01L 2200/028* (2013.01); *B01L 2200/10* (2013.01); *B01L 2300/0654* (2013.01); *B01L 2300/0874* (2013.01); *B01L 2300/0887* (2013.01); *B01L 2400/0487* (2013.01)

(58) Field of Classification Search
CPC ..... B01L 2300/0654; B01L 2300/0874; B01L 2300/0887; B01L 2400/0487; B01L 2300/0627; B01L 3/50273; B01L 3/563; B01L 2200/026; G01N 21/85
See application file for complete search history.

(56) References Cited

U.S. PATENT DOCUMENTS

| | | |
|---|---|---|
| 2018/0080570 A1 | 3/2018 | Block et al. |
| 2020/0283722 A1 | 9/2020 | Komori et al. |

OTHER PUBLICATIONS

PCT/IB2022/052638, Mar. 23, 2022, WO 2022/201048 A1 published Sep. 29, 2022.

\* cited by examiner

MODULAR LAB-ON-A-CHIP DEVICE FOR THE ANALYSIS OF FLUIDS

CROSS-REFERENCE TO RELATED APPLICATIONS

This patent application is a 35 U.S.C. § 371 National Stage filing of International Application No. PCT/IB2022/052638, filed on Mar. 23, 2022, which application claims priority of Italian Patent Application No. 102021000006980 filed on Mar. 23, 2021, the entire disclosure of which is incorporated herein by reference.

TECHNICAL FIELD

The present invention relates to a modular lab-on-a-chip device for the analysis of fluids, in particular for the multi-parameter analysis of fluids.

STATE OF THE ART

There are known various types of industrial machines and plants for a wide range of tasks such as food packaging, production of common goods, earth moving or others.

All these types of industrial machines and plants share the fact that scheduled maintenance operations are required to ensure their proper functioning and minimise the likelihood of breakdowns.

It should be noted that a significant number of mechanical breakdowns are related to the condition of the lubrication (oil) or working fluid. For this reason, periodic chemical-physical checks of the lubrication and working fluids are carried out by specialised external laboratories, with the main purpose of monitoring the characteristics of lubrication and working fluids and consequently the state of health of mechanical components.

It is also known that process fluids and/or waste fluids (such as wastewater) are obtained during the industrial machines and plants operation. In this case also, it is necessary to obtain precise information in relation to the chemical and physical parameters of these process fluids and/or waste fluids in order to manage their proper disposal. For this reason, periodic analyses are carried out.

During operation of the industrial machines and plants, it may also be required to monitor the properties of fluids such as process fluids to ensure certain process conditions such as a level of fluid sanitation, a given fluid composition and the like.

For all of the aforementioned conditions and/or situations, it would be advantageous out an immediate and continuous analysis of the fluid characteristics.

Therefore a need is perceived in the sector to obtain means for monitoring the characteristics of a fluid, particularly in the industrial environment.

Subject of the Invention

Aim of the present invention is to provide means for the analysis of fluids, in particular for determining a plurality of fluid parameters.

A further aim of the present invention is to provide means for real-time analysis of fluids.

Furthermore, an aim of the present invention is to provide means that can be used in small spaces.

Another aim of the present invention lies in providing means that can be easily adapted to different situations of use.

The aforementioned aims are achieved by the present invention as it relates to a modular lab-on-a-chip device according to claim 1.

Further advantageous features of the present invention are set forth in the dependent Claims.

Furthermore, the aforementioned aims are also achieved by the present invention as it relates to an analysis module according to claim 16.

Further advantageous features of the present invention are set forth in the dependent Claims.

BRIEF DESCRIPTION OF THE DRAWINGS

For a better understanding of the present invention, two preferred embodiments thereof are hereinafter described, provided by way of merely non-limiting example and with reference to the accompanying drawings, wherein.

DETAILED DESCRIPTION OF PREFERRED EMBODIMENT OF THE INVENTION

Figure 1A:
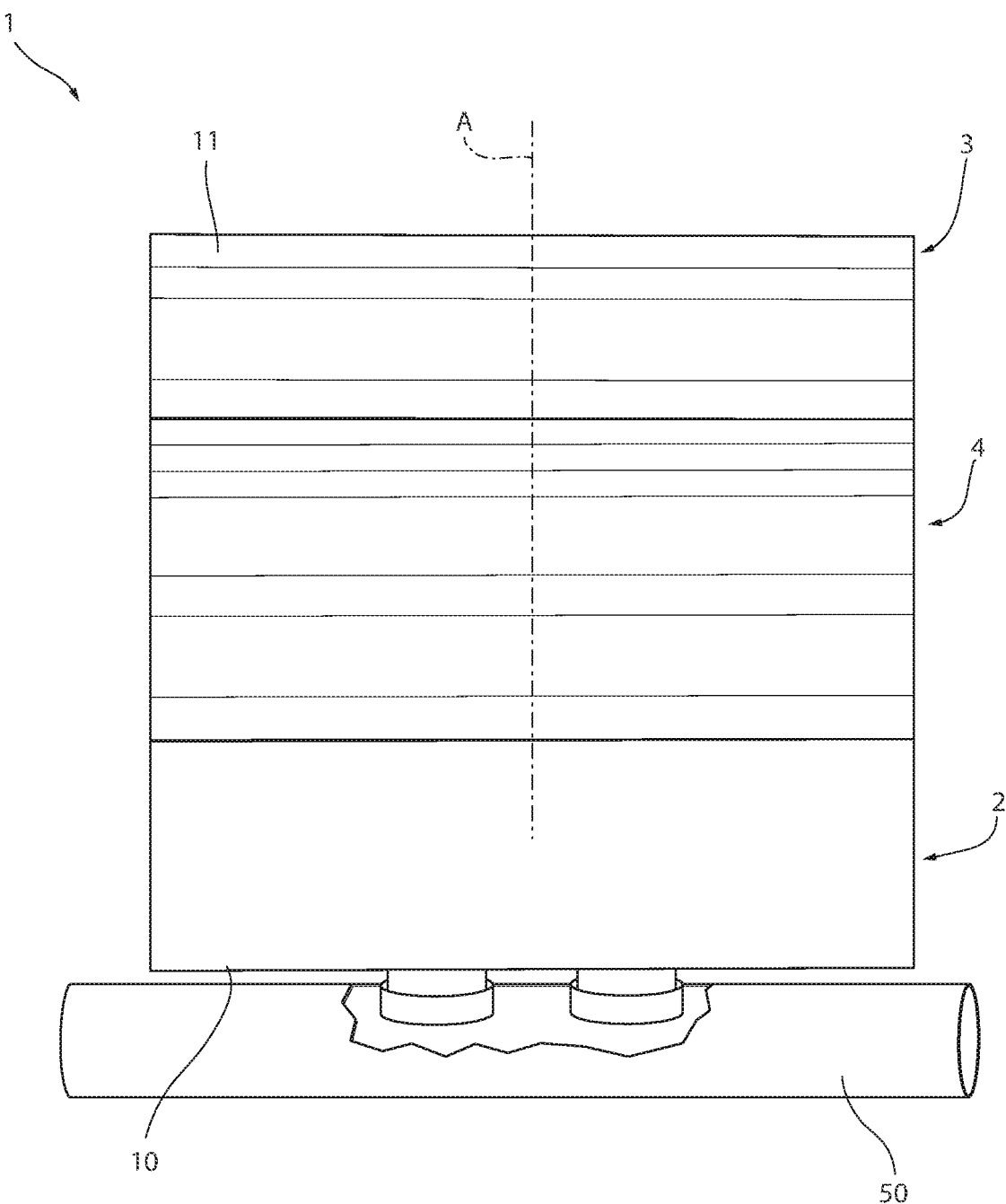
FIGS. 1A and 1B schematically show the use of a lab-on-a-chip device for the analysis of a fluid according to a first embodiment of the present invention, with parts removed for clarity.

In FIGS. 1A to 3B, number 1 generically denotes, as a whole, a modular lab-on-a-chip (LOC) device for the analysis of a fluid, in particular for determining at least one characteristic of the fluid and/or of one or more components present in the fluid, even more particularly for determining physical and/or chemical and/or chemical-physical parameters of the fluids and/or of one or more components present in the fluids.

Examples of physical and/or chemical/physical parameters of fluids of possible interest may be viscosity, density, composition, conductivity, temperature, pH, oxidation-reduction potential, concentration of one or more parts of the fluid, colour, spectroscopic properties and others.

Examples of components present in fluids may be debris, contamination, particles, molecules and the like; and physical and/or chemical and/or chemico-physical parameters may be, for example, size, size distribution, concentration, chemical composition and others.

According to some more preferred non-limiting embodiments, the LOC device 1 is configured for a multi-parameter analysis of the fluid. According to such preferred embodiments, the LOC device 1 is configured to determine a plurality of characteristics of the fluid and/or one or more components present in the fluid, in particular a plurality of chemical and/or physical and/or physicochemical parameters.

It should be noted that the term lab-on-a-chip (LOC) denotes a single device operating with low fluid volumes of a few millilitres or less. In particular, the term lab-on-a-chip denotes that the device incorporates a plurality of functions.

In addition, the LOC device 1 is small in size so as to be used in limited spaces.

According to some non-limiting embodiments, the LOC device 1 may present:
- a maximum length of 15 cm, in particular 10 cm, and even more in particular 5 cm;
- a maximum height of 15 cm, in particular 10 cm, even more in particular 5 cm; and
- a maximum depth of 15 cm, in particular 10 cm, and even more in particular 5 cm.

According to some non-limiting embodiments, the LOC device 1 may present:
- a minimum length of 1 cm, in particular 3 cm, and even more in particular 5 cm;
- a minimum height of 1 cm, in particular 3 cm, and even more in particular 5 cm; and
- a maximum depth of 1 cm, in particular 3 cm, and even more in particular 5 cm.

Figure 1B:
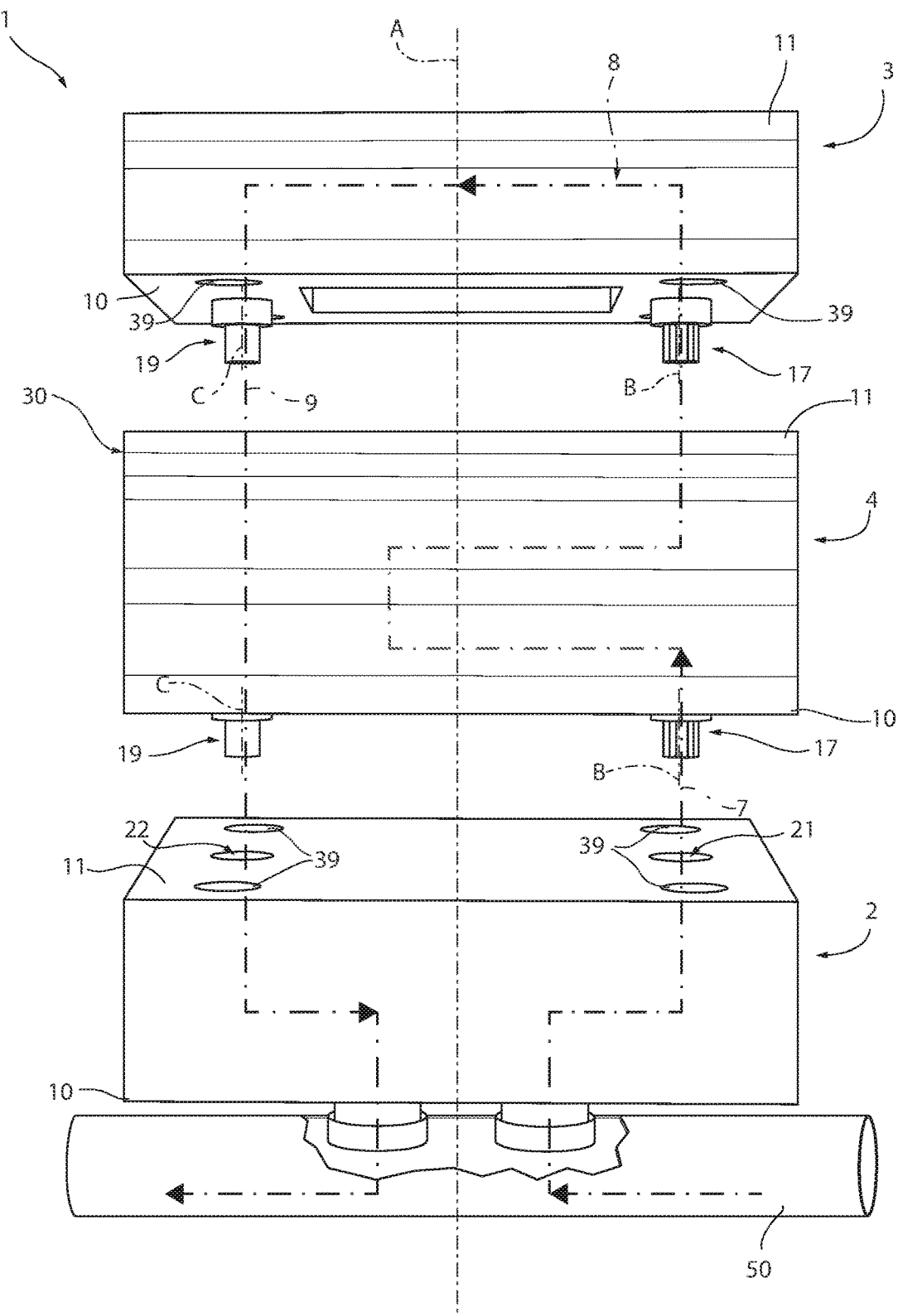
Figure 2:
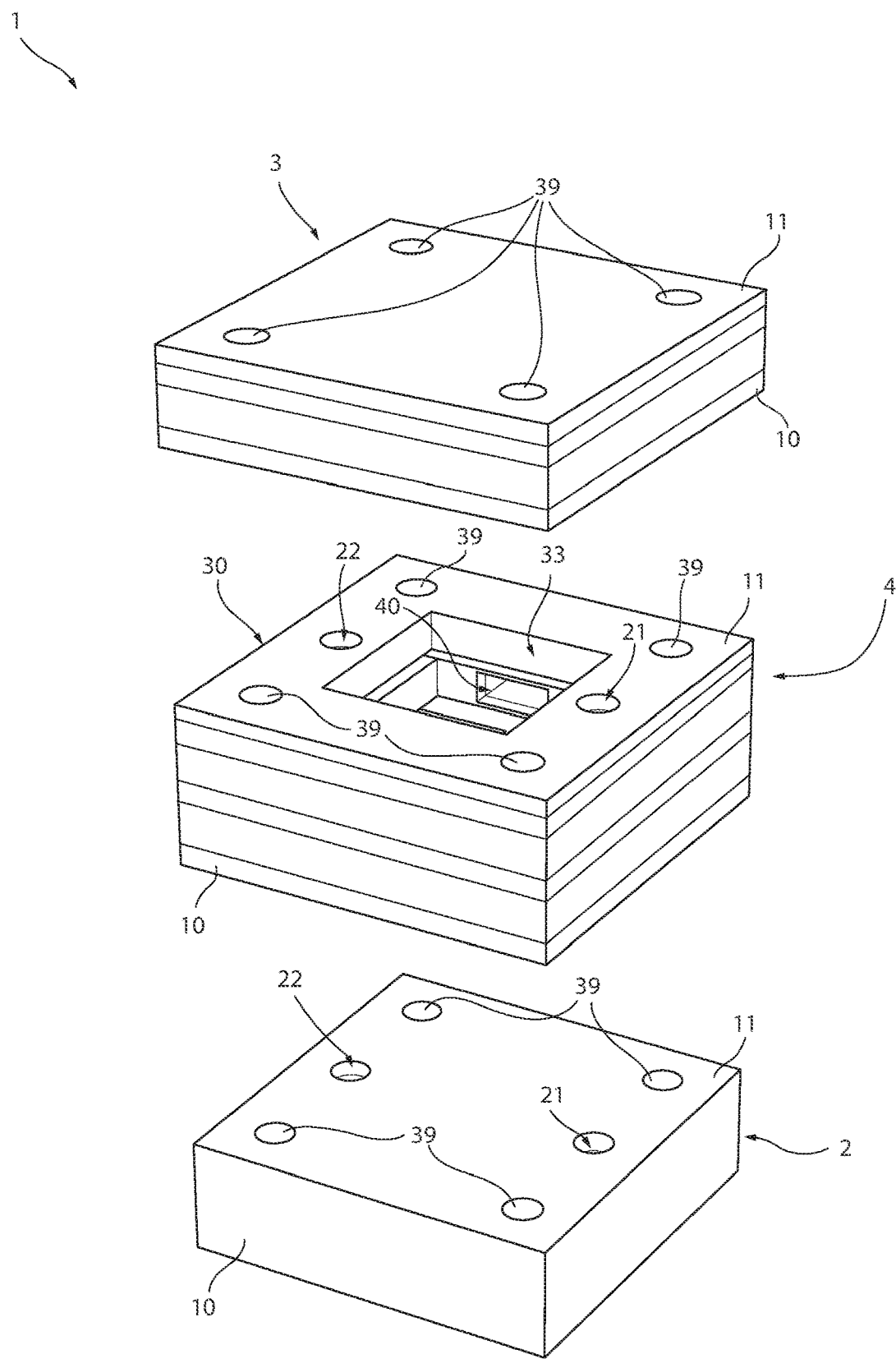
FIG. 2 shows in an exploded view the lab-on-a-chip device of FIGS. 1A and 1B, with parts removed for clarity.

In the specific case of FIGS. 1A-1B, the LOC device 1 is incorporated in an industrial machine and/or plant for the analysis of a fluid of the industrial machine and/or plant. A portion of the industrial machine and/or plant is referred to as 50. In particular, in the specific case, the portion 50 is a pipe into which, in use, the fluid to be analysed flows.

In other words, the LOC device 1 and the industrial machine and/or plant define and/or are parts of an industrial system.

Alternatively, the LOC device 1 may be incorporated into a laboratory treatment machine or in an analysis machine.

According to some preferred non-limiting embodiments, the fluid is a liquid such as a lubricant, a process liquid, a working liquid, a liquid to be treated and the like.

Referring in particular to FIGS. 1A to 9, the LOC device 1 comprises at least:
- a base module 2;
- an end module 3; and
- one or more analysis modules 4 arranged between the base module 2 and the end module 3 in sequence between one another.

In more detail and as further described hereinafter, each analysis module 4 is configured to determine characteristics of the fluid and/or components present in the fluid. In particular, each analysis module 4 is configured to determine characteristics that differ from those of the other analysis modules 4.

Advantageously, the base module 2 and/or the end module 3 have neither the function nor the aim of determining the characteristics of the fluid and/or the components present in the fluid.

In particular, the base module 2 and/or the end module 3 are passive modules, while the analysis module (s) 4 are active modules.

According to some preferred embodiments, the LOC device 1 comprises at least two, preferably at least three, analysis modules 4. A LOC device 1 for determining a plurality of parameters, i.e. a LOC device 1 for multi-parameter analysis, is thereby simply obtained.

In particular, the LOC device 1 extends along a longitudinal axis A and the base module 2 and the end module 3 define the two opposite ends of the LOC device 1 with respect to the longitudinal axis A.

Advantageously, the base module 2, end module 3 and analysis module (s) 4 are stacked and in contact with each other.

In the embodiment shown, the LOC device 1 comprises a single analysis module 4, in contact with either the base module 2 and the end module 3.

According to alternative embodiments not shown, the LOC device 1 comprises several analysis modules 4.

According to these embodiments, an analysis module 4 may be in contact with the base module 2 and another base module 4 may be in contact with the end module 3. In addition, each analysis module 4 is in contact with at least another analysis module 4.

Figure 3A:
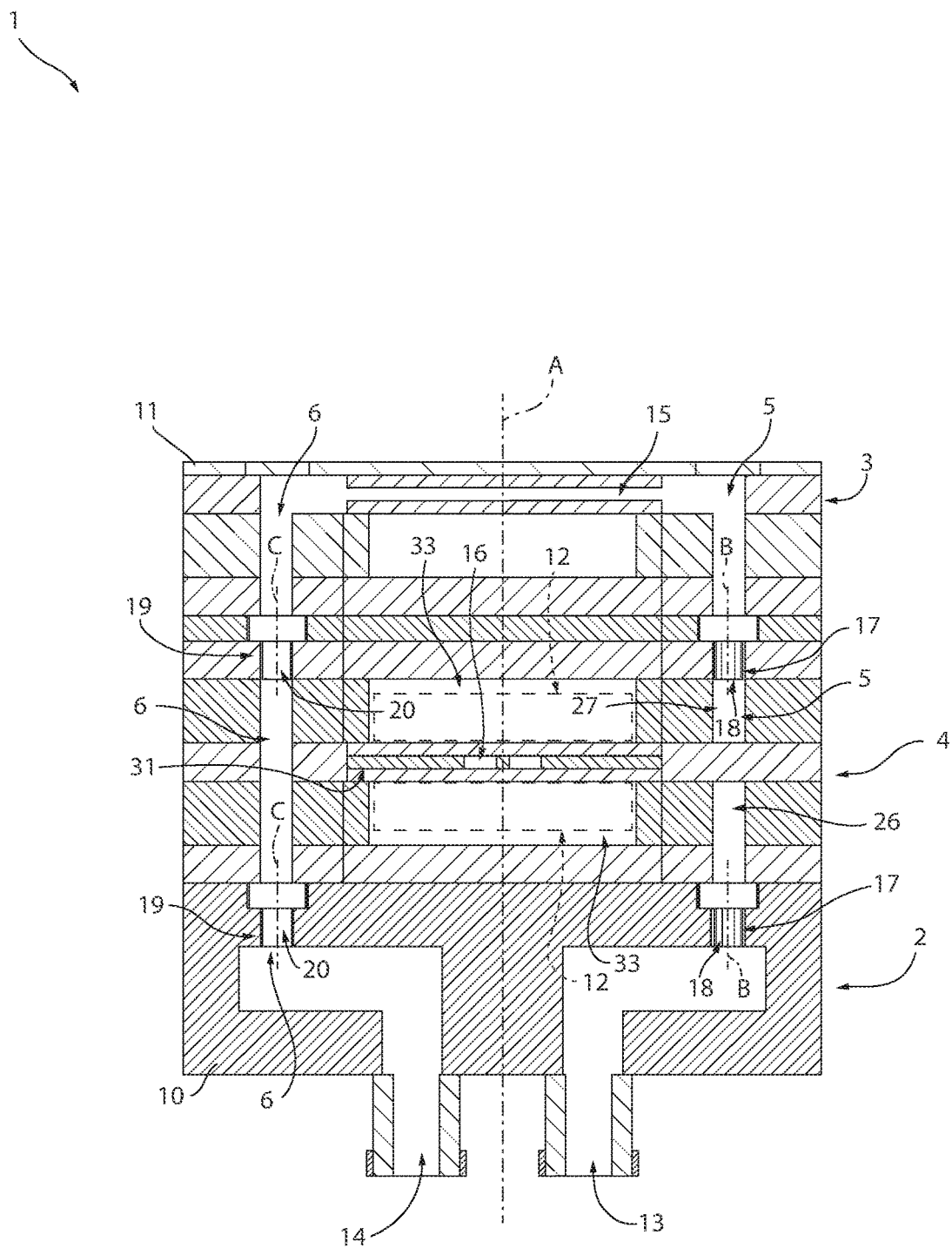
FIGS. 3A and 3B show in a section view the lab-on-a-chip device of FIGS. 1A and 1B, with parts removed for clarity.
Figure 3B:
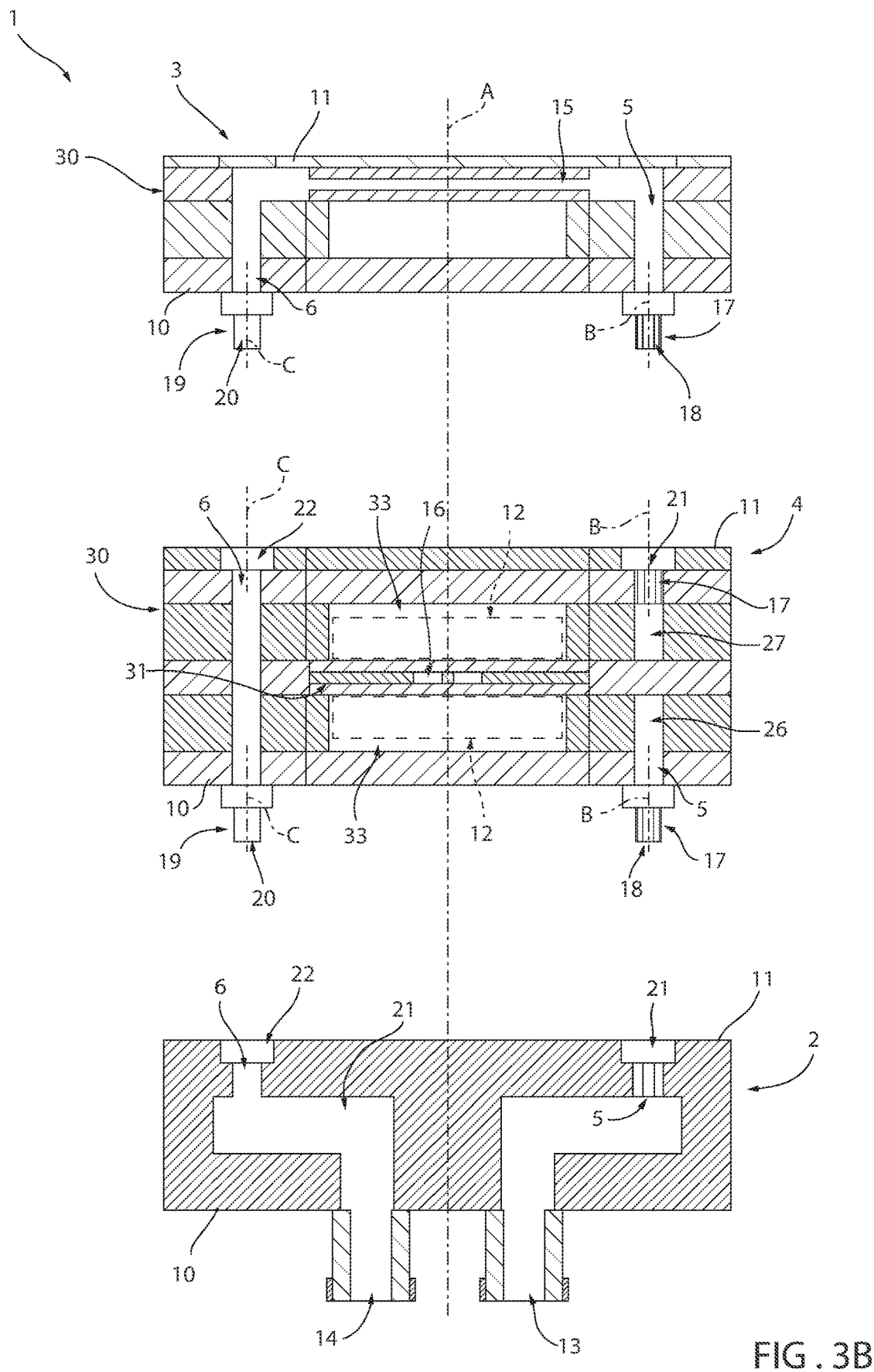

Each of the base module 2, the end module 3 and the analysis module (s) 4 comprises a respective first conduit 5 and a respective second conduit 6 (see for example FIGS. 3A and 3B).

Preferably, each of the base module 2 and the analysis module (s) 4 may be designed so that the respective first conduit 5 and the respective second conduit 6 are void of a fluidic connection between each other in the respective base module 2 or the respective analysis module 4; in other words, the base module 2 and the analysis module (s) 4 are void of a respective fluidic channel that could fluidically connect the respective first conduit 5 and the respective second conduit 6.

According to some non-limiting embodiments, each first conduit 5 and each second conduit 6 presents a diameter between 1 mm and 5 mm.

Referring in particular to FIGS. 1B, 3A and 3B, the set of first conduits 5 defines and/or at least partially forms a first portion 7 of a fluidic channel 8 (schematically shown in FIG. 1B) of the LOC device 1; and the set of second conduits 6 defines and/or at least partially forms a second portion 9 of the fluidic channel 8.

In particular, the fluidic channel 8 is configured to allow the fluid to flow along a path defined by the fluidic channel 8 itself, and in particular within the LOC device 1. Preferably, and as will be explained in more detail hereinafter, the second portion 9 of the fluidic channel 8 is designed to allow the discharging of the fluid from the LOC device 1, while the first portion 7 allows the inlet of the fluid within the LOC device 1 and to supply fluid to the analysis module (s) 4 to make the analysis of the fluid possible.

It should be noted that the flow of fluid within the LOC device 1, in particular in the fluidic channel 8, may be obtained by means of a pump or passively, e.g. by using a difference of pressures present in the machine and/or system wherein the LOC device 1 is installed.

In case a pump is needed to actively control the fluid flow, the LOC device 1 may comprise a pump arranged outside of the base module 2, the end module 3 and the analysis module (s) 4 and fluidically (and externally) connected to the inlet channel 13 and/or the outlet channel 14. Preferably, each of the inlet channel 13 and outlet channel 14 present a respective diameter between 1 mm and 5 mm.

Alternatively or additionally, the LOC device 1 may comprise at least one pumping module (not shown) interposed between the base module 2 and the end module 3. Preferably, the pumping module is in contact with the base module 2 and interposed between the base module 2 and an analysis module 4.

In more detail, the pumping module could comprise, in particular therein, a pump, such as a peristaltic pump.

In addition, the pumping module could also comprise a respective first conduit 5 and a respective second conduit 6. In particular, the respective first conduit 5 may be in fluidic connection with the first conduit 5 of the base module 2 to receive the fluid from the base module 2. The first conduit 5 could also be in fluidic connection with the first conduit 5 of the subsequent analysis module 4.

According to some non-limiting embodiments, the LOC device 1 could also comprise one or more additional pumping modules, in particular each one interposed between, and in contact with, two respective analysis modules 4.

According to some preferred embodiments, each of the base module 2, the end module 3 and the analysis module (s) 4 (and the pumping module (s)) comprise one first end 10 and one second end 11 opposite to each other along the respective longitudinal axis A.

In particular, each analysis module 4 is arranged so that the respective first end 10 is in contact with a respective second end 11 (of the base module 2 or of another analysis module 4 or of a pumping module) and/or each second end 11 of each analysis module 4 is in contact with a respective first end 10 (of the end module 3 or of another analysis module 4 or of a pumping module).

Even more in particular, the first end 10 of the base module 2 and the second end 11 of the end module 3 define and/or form ends of the LOC device 1 with respect to the longitudinal axis A; in other words, the first end 10 of the base module 2 and the second end 11 of the end module 3 are in contact with only one module (analysis module 4 or pumping module) of the LOC device 1.

According to some non-limiting embodiments, the LOC device 1, in particular the base module 2 and/or the analysis module(s) 4 and/or the end module 3 and/or the pumping module (s) may be made of plastic material (e.g. ABS, plexiglass etc.), polymeric material (e.g. PDMS, PMMA, PTFE, PVC, PP, PET etc.), silicon or glassy material (e.g. calcium fluoride, pyrex etc.).

In addition, according to some variations, the base module 2, the analysis module (s) 4 and the end module 3 may be made of different materials.

In more detail (see FIGS. 3A and 3B), the base module 2 comprises an inlet channel 13, in particular a single inlet channel 13, fluidically connected to the respective first conduit 5 to allow the inlet of the fluid within the LOC device 1; and at least one outlet channel 14, in particular a single outlet channel 14, fluidically connected to the respective second conduit 6 to allow the discharging of the fluid from the LOC device 1.

In particular, the fluidic channel 8 comprises the inlet channel 13 and the outlet channel 14. Even more in particular, the inlet channel 13 and outlet channel 14 define respective end portions of the fluidic channel 8.

In more detail (see 3A, 3B, 8 and 9), the end module 3 comprises a connecting conduit 15 in (direct) fluidic connection with the respective first conduit 4 and the respective second conduit 5 and (fluidically) connecting the first portion 7 and the second portion 9 of the fluidic channel 8 with each other.

Each analysis module 4 comprises a respective analysis conduit 16 in (direct) fluidic connection with the respective first conduit 5 to receive at least a portion of the fluid (and in particular to also return at least a portion of the fluid, preferably (substantially) all of the fluid, which has entered the analysis conduit 16 to the first conduit 5); and a sensor unit 12 (schematically shown in FIGS. 3A, 3B and 4) configured to determine, in particular in real-time, at least one characteristic, such as a chemical parameter and/or a physical parameter and/or a physicochemical parameter) of the fluid and/or of the components present in the fluid when the fluid is present, in use, within the respective analysis conduit 16.

In particular, the fluidic channel 8 may also comprise each analysis channel 16. Preferably, if the LOC device 1 comprises two or more analysis modules 4 the analysis channels 16 are fluidically arranged in series with each other.

According to some preferred embodiments and if the LOC device 1 comprises two or more analysis modules 4, the sensor units 12 may be configured to determine different characteristics. In other words, the sensor units are different.

Different types of sensor units may be used: for example, there are sensor units that can determine the characteristics when being in contact with the fluid, but there may also be sensor units that can determine the characteristics without any contact with the fluid.

According to some possible embodiments, the sensor units comprise at least one or more of the following sensors: an optical sensor, a spectroscopy sensor (UV-VIS and/or NIR and/or MIR spectroscopy), a temperature sensor, a fluid titration sensor, a pH sensor, a sensor for determining the oxidation-reduction potential, a sensor for determining conductivity, a sensor for determining density, a sensor for determining viscosity, and a sensor for determining components and/or contaminants and/or particles and/or debris.

According to some possible non-limiting embodiments, also the end module 3 may comprise a sensor unit for analysing the fluid as it flows, in use, into the connecting conduit 15.

Preferably, the LOC device 1 may also comprise a control and analysis unit operatively coupled to the sensor units (via cable and/or wirelessly) and configured to control the sensor units and/or obtain signals in relation to measurements of the sensor units and/or analyse the results of measurements of the sensor units.

According to some possible embodiments, the LOC device 1, in particular the control and analysis unit, may be configured to operate remotely, e.g. to manage analysis results remotely.

Referring in particular to FIGS. 2, 3A, 3B, 7 and 8, the LOC device 1 further comprises a plurality of first connecting elements 17 each having a respective first channel 18 and a plurality of second connecting elements 19 each having a respective second channel 20.

Each first connecting element 17 may be arranged between two respective first conduits 5 so that the respective first channel 18 establishes a (direct) fluidic connection between the respective first conduits 5.

Each second connecting element 19 may be arranged between two respective second conduits 6 such that the respective second channel 20 establishes a (direct) fluidic connection between the respective second conduits 6.

In the embodiment shown, each analysis module 4 and/or end module 3 comprises at least:

- a respective first connecting element 17 of the plurality of first connecting elements 17, with the respective first channel 18 in fluidic connection with the respective first conduit 5 (of the respective analysis module 4 or end module 3); and
- a respective second connecting element 19 of the plurality of second connecting elements 19, with the respective second channel 20 in fluidic connection with the respective second conduit 6 (of the respective analysis module 4 or end module 3).

Preferably, the base module 2 may be void of a first connecting element 17 and void of a second connecting element 19.

Furthermore, in case one or more pumping modules is present, each pumping module also comprises a respective first connecting element 17 and a respective second connecting element 19.

According to some preferred non-limiting embodiments, each first connecting element 17 and each second connecting element 19 protrude from the respective analysis module 4 or end module 3 or from the respective pumping module towards the base module 2.

In more detail, each first connecting element 17 extends along a first longitudinal axis B and each second connecting element 19 extends along a second longitudinal axis C. In particular, each first longitudinal axis B and the respective second longitudinal axis C may be parallel to each other.

Preferably, each first channel 18 and each second channel 20 may be coaxial to the respective first longitudinal axis B and the respective second longitudinal axis C; in other words, each first channel 18 and each second channel 20 may extend along the respective first longitudinal axis B and, respectively, the respective second longitudinal axis C.

In more detail, the first connecting elements 17 may be coaxial to each other and the second junction elements 19 can be coaxial to each other. Furthermore, each first connecting element 17 and the respective second connecting element 19 may be parallel and arranged (laterally) to each other.

Advantageously, each first connecting element 17 and each second connecting element 19 of each analysis module 4 (and/or each pumping module) may be arranged at the respective first end 10. In addition, the respective first connecting element 17 and the respective second connecting element 19 of the end module 3 may be arranged at the respective first end 10.

In further detail, each first connecting element 17 may present a transversal section with respect to a section plane perpendicular to the respective first longitudinal axis B, which equals the respective transversal sections of the other first connecting elements 17 (again with respect to a section plane perpendicular to the respective first longitudinal axis B).

Furthermore, each second connecting element 19 may present a transversal section, with respect to a section plane perpendicular to the respective second longitudinal axis C, which equals the respective transversal sections of the other second connecting elements 19 (again with respect to a section plane perpendicular to the respective first longitudinal axis B).

Advantageously, the respective transversal sections of the first connecting elements 17 and the respective transversal sections of the second connecting elements 19 are different from one another. This ensures that the first portion 7 and the second portion 9 of the fluidic channel 8 are properly formed. In other words this ensures that the user assembles the LOC device 1 properly. In still other words, it is thereby ensured that (while the LOC device 1 is being assembled) first connecting element 17 is interposed between two respective first conduits 5 and each second junction element 19 is interposed between two respective second conduits 6.

In the specific example shown (see FIG. 4), each first connecting element 17 presents a star-shaped transversal section, while each second connecting element 19 has a circular transversal section. However, the transversal sections may have different shapes from these examples, such as square, elliptical, triangular, oval, etc.

Referring in particular to FIGS. 1B, 3A, 3B, 8 and 9, each first connecting element 17 and each second connecting element 19 may be at least partially, in the non-limiting case shown (substantially) integrally, inserted into one of the two respective first conduits 5 and, respectively, into one of the two respective second conduits 6. For example, two respective analysis modules 4 can thereby be coupled next to each other, the base module 2 and a respective analysis module 4 (or pumping module) and the end module 3 and a respective analysis module 4.

In more detail, each first connecting element 17 may be inserted into at least one respective first seat 21 at least partially delimiting a respective first conduit 5, in particular one of the two respective first conduits 5, and each second connecting element 19 may be inserted into a respective second seat 22 at least partially delimiting a respective second conduit 6, in particular one of the two respective second conduits 6.

In particular, each first seat 21 and each second seat 22 may be arranged at an end portion of a respective first conduit 5 and a respective second conduit 6.

Even more in particular, each analysis module 4 and/or base module 2 and/or end module 3 and/or each pumping module may comprise (at most) a respective first seat 21 and a respective second seat 22.

In the case of the embodiment shown, the end module 3 comprises neither a first seat 21 nor a second seat 22.

Furthermore, each first seat 21 and the respective first connecting element 17 may be complementary to each other and each second seat 22 and respective second connecting element 19 may be complementary to each other.

In further detail, each first seat 21 may present a transversal section (with respect to a section plane perpendicular to an axis coaxial to the respective first longitudinal axis B) that equals the respective transversal sections of the other first seats 21 and each second seat 22 has a transverse section (with respect to a section plane perpendicular to an axis coaxial to the respective second longitudinal axis C) that equals the respective transversal sections of the other second seats 22.

Preferably (and similarly to the respective transversal sections of the first connecting elements 17 and the second connecting elements 19) the respective transversal sections of the first seats 21 may be different from the respective transversal sections of the second seats 22.

Moreover, each first seat 21 and each second seat 22 of each analysis module 4 (and each pumping module) is arranged at the respective second end 11.

In addition, each first seat 21 and each second seat 22 of the base module 2 may be arranged at their respective second end 11.

Referring in particular to FIGS. 3A, 3B, 4, 6 and 10A to 10D, each first conduit 5 of each analysis module 4 comprises a first conduit portion 26 and a second conduit portion 27, in particular the first conduit portion 26 and the second conduit portion 27 are not (directly) fluidically connected, but respective the conduit analysis 16 fluidically connects the respective first conduit portion 26 and the respective second conduit portion 27. In other words, the respective analysis conduit 16 is fluidically interposed between the respective first conduit portion 26 and the respective second conduit portion 27.

Figure 10E:
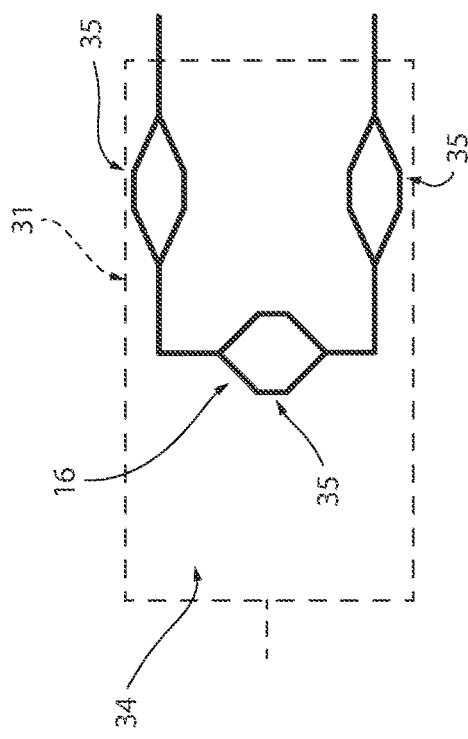

FIG. 10E shows a possible solution, wherein the analysis conduit 16 may comprise more than one main portion 35, in the specific case four. In particular, each of the main portions 35 may be associated with a respective sensor unit 12. Preferably, each sensor unit 12 may be configured to determine one or more characteristics different from the characteristics determined by the other sensor units 12.

According to some preferred embodiments, the analysis module 4 according to FIG. 10E may be configured to determine a fluid viscosity and/or a fluid temperature and/or an amount of water in the fluid and/or a state of wear and/or contamination of the fluid.

In more detail, the analysis module 4 according to FIG. 10E may comprise:
 a first sensor unit 12 having one or more optical sensors, in particular two, even more in particular a reference optical sensor and a measurement optical sensor, to determine an amount of incident light; and/or
 a second sensor unit 12 having one or more sensors, in particular two, to determine a fluid relative humidity; and/or
 a third sensor unit 12 having a temperature sensor, such as a thermocouple, to determine a fluid temperature; and/or
 a fourth sensor unit 12 with one or more flow sensors.

In particular, in case the LOC device 1 comprises a plurality of analysis modules 4, the analysis conduits 16 may be fluidically arranged in series.

Preferably, the second conduit portion 27 may be fluidically arranged downstream of the first conduit portion 26.

In more detail, each first conduit portion 26 may be directly fluidically connected to the respective first conduit 5.

Furthermore, each first seat 21 may at least partially delimit a zone of the first portion of the conduit 26 and each second seat 22 may at least partially delimit a zone of the second portion of the conduit 27.

According to some preferred embodiments, each analysis module 4 may comprise at least one first auxiliary conduit 28 and one second auxiliary conduit 29. In particular, each first auxiliary conduit 28 is configured to establish a (direct) fluidic connection between the respective first conduit portion 26 and the respective analysis conduit 16, and each second auxiliary conduit 29 is configured to establish a (direct) fluidic connection between the respective analysis conduit 16 and the respective second conduit portion 27.

Preferably, each analysis conduit 16 is fluidically interposed between the respective first auxiliary conduit 28 and the respective second auxiliary conduit 29.

In addition, each first auxiliary conduit 28 is fluidically arranged upstream of the respective second auxiliary conduit 29.

Referring in particular to FIGS. 1B to 7, each analysis module 4 may comprise:
 a support mask 30 having at least the respective first conduit 5 and the respective second conduit 6, and in particular also the respective first auxiliary conduit 28 and the respective second auxiliary conduit 29;
 and a main support 31 having the respective analysis conduit 16.

Advantageously, each support mask 30 and the respective main support 31 may be made of different materials.

Preferably, each first connecting element 17 and each second connecting element 19 of each analysis module 4 may be integral with the respective support mask 30.

In more detail, each support mask 30 may comprise a first inner housing seat, housing, in particular removably, the respective main support 31 and at least a second inner housing seat 33 housing the respective sensor unit.

According to some possible embodiments, one or more support masks 30 may comprise multiple second inner housing seats 33 to house different portions of the respective sensor unit 12.

For example, the sensor unit 12 may comprise at least a first portion and a second portion, and each of the first portion and the second portion may be arranged in a respective inner housing seat 33. According to some possible variations, the main support 31 could be interposed between the first portion and the second portion of the sensor unit 12; this configuration could be particularly advantageous for optical and/or spectroscopy analyses.

Figure 5:
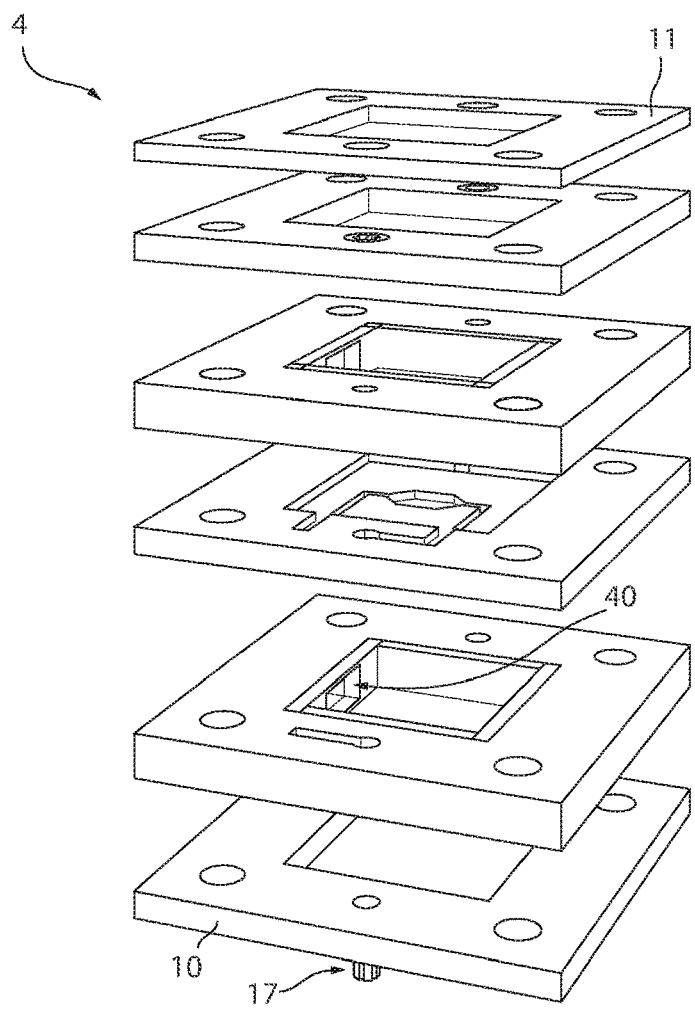
FIG. 5 shows in an exploded view the portion of FIG. 4, with parts removed for clarity.

Referring in particular to FIG. 5, each support mask 30 may comprise and/or consist of a plurality of structural layers stacked on top of each other, and in particular in contact with each other. Each structural layer (substantially) presents a 2-dimensional extent and the plurality of structural layers as a whole defines the 3-dimensional extent of the respective support mask 30 (and the respective analysis module 4). The construction of the analysis module (s) 4 is thereby facilitated.

According to some preferred embodiments, each support mask 30 may comprise means for fixing the plurality of structural layers. For example, such fixing means may include screws, pins or the like and/or may include glue.

Preferably, the LOC device 1, in particular each support mask 30, comprises one or more openings 40 designed to allow the passage of cables (e.g. control and/or data exchange and/or power supply cables) and/or pipes, in particular the cables and/or pipes being connected to the respective sensor unit 12.

For example, at least one respective cable could connect the sensor unit 12 to the control and analysis unit.

Figure 4:
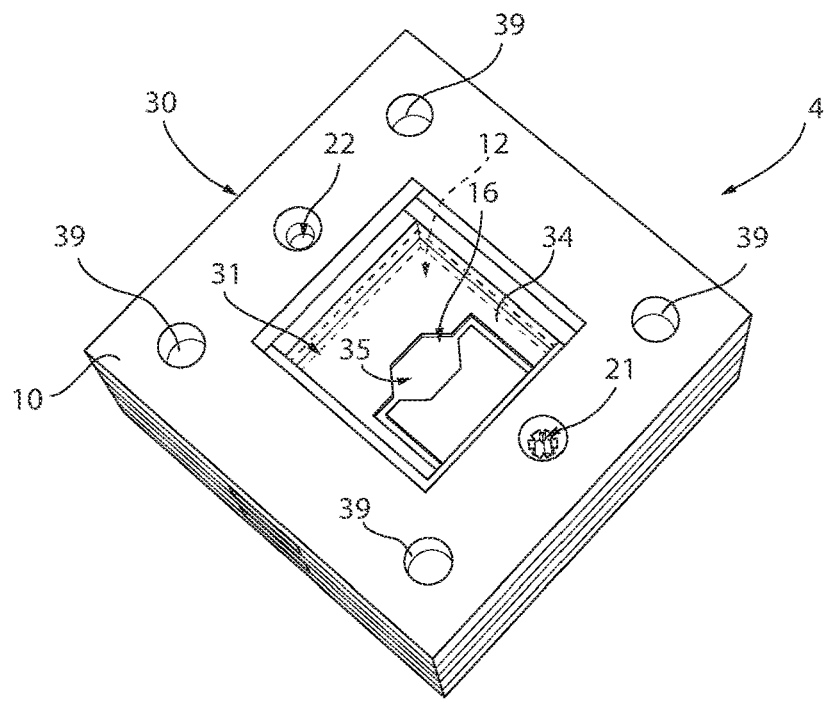
FIG. 4 shows in a perspective view a portion of the lab-on-a-chip device of FIGS. 1A and 1B, with parts removed for clarity.
Figure 6:
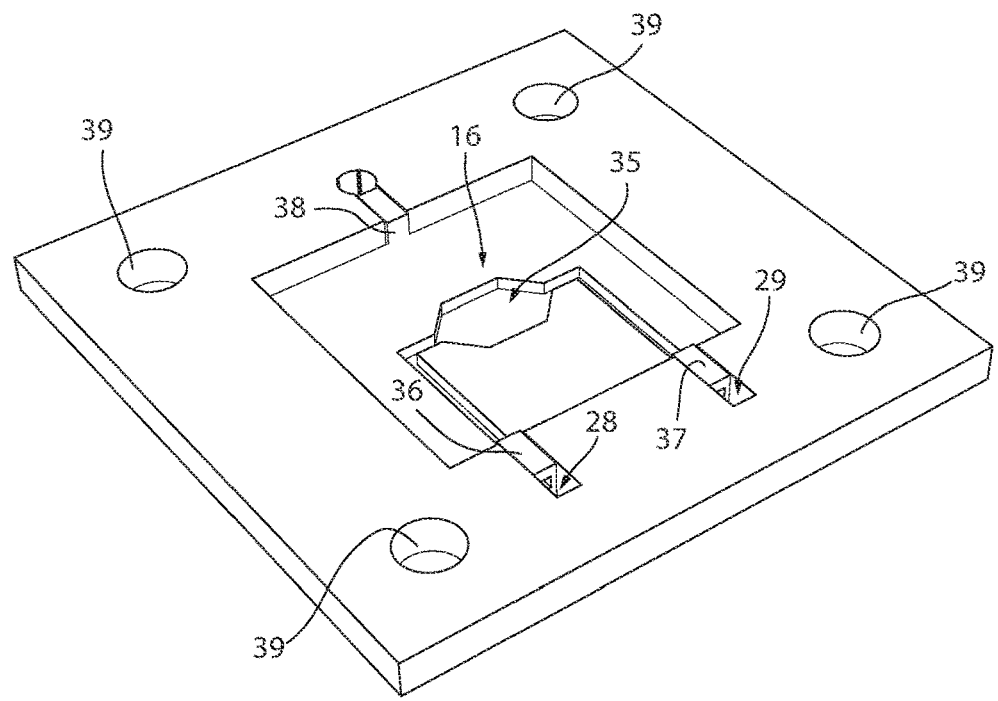
FIG. 6 shows in a perspective view a detail of the portion of FIG. 4, with parts removed for clarity.
Figure 7:
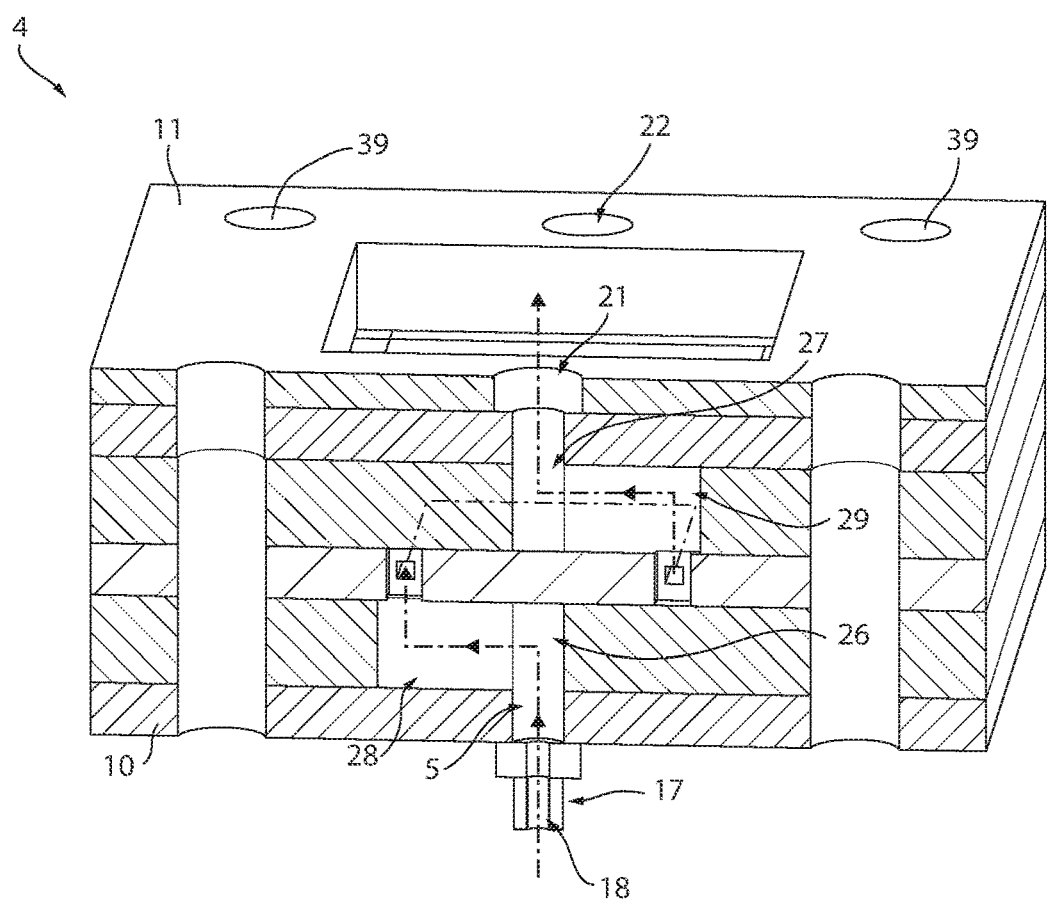
FIG. 7 shows in a section view the portion of FIG. 4, with parts removed for clarity.

Referring in particular to FIGS. 4, 5 and 6, each main support 31 comprises at least:
 a (central) main zone 34 having a main portion 35 of the analysis conduit 16;
 a first coupling element 36 protruding from the main zone 34 and having a first auxiliary portion of the analysis conduit 16 for feeding the fluid from the respective first conduit 5, in particular from the respective first conduit portion 26, to the respective main portion 35;
 a second coupling element 37 protruding from the main zone 34 and having a second auxiliary portion of the analysis conduit 16 for receiving the fluid from the main portion 35 and for feeding the fluid to the respective first conduit 5, in particular to the respective second conduit portion 27; and
 a third coupling element 38 protruding from the main zone 34.

In particular, the respective sensor unit 12 of each analysis module 4 is configured to analyse the fluid as it flows, in use, into the respective main portion 35.

Preferably, each first coupling element 36 and the respective second coupling element 37 protrude from a first side of the respective main zone 34, and the third coupling element 38 protrudes from a second side of the respective main zone 34 opposite the first side.

In further detail, each support mask 30, in particular the respective first inner housing seat 32, may comprise a first slot and a second slot respectively housing the respective first coupling element 36 and the respective second coupling element 37, and preferably also a third slot housing the respective third coupling element 38.

Advantageously, each main zone 34 may present a (substantially) 2-dimensional configuration.

Moreover, the main zone 34 could cooperate with the respective sensor unit 12 to partially delimit the analysis conduit 16.

According to some embodiments, at least the respective main area 34 of one or more main supports 31 may be transparent to light (e.g. in the UV-Visible or near, mid and/or far infra-red range).

Referring in particular to FIGS. 10A to 10D, the shape of an analysis conduit 16, in particular of the respective main portion 35, may vary depending on the specific measurement to be carried out and/or depending on the sensor unit 12.

Figure 8:
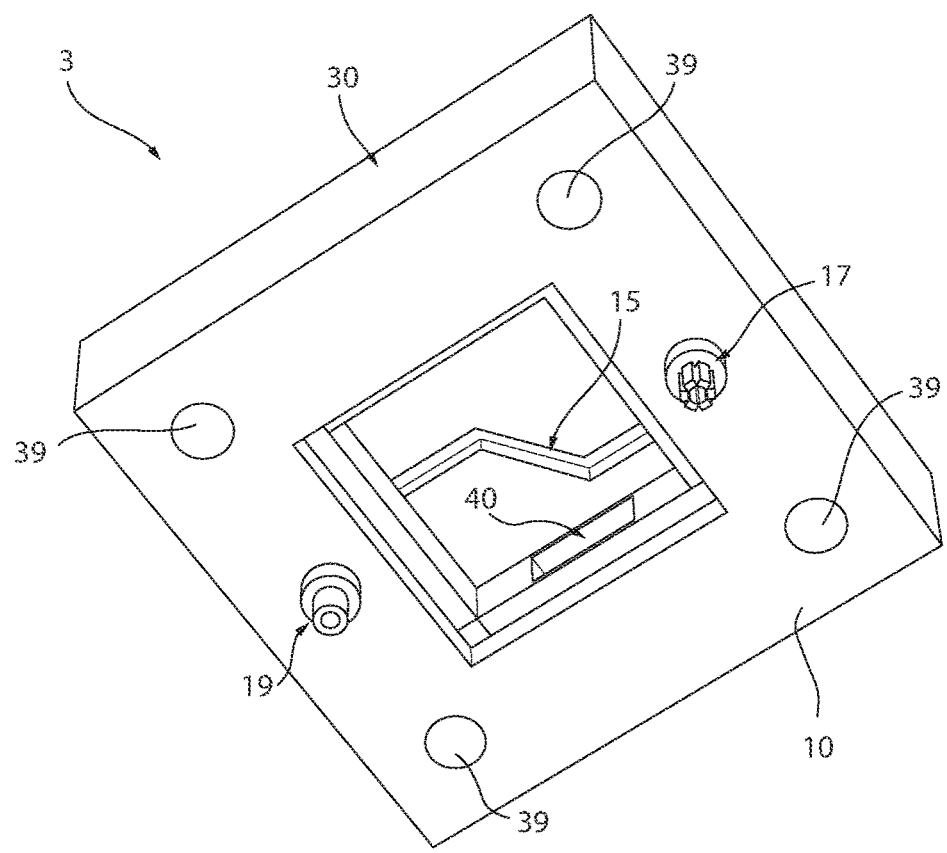
FIG. 8 shows in a perspective view another portion of the lab-on-a-chip device of FIGS. 1A and 1B, with parts removed for clarity.
Figure 9:
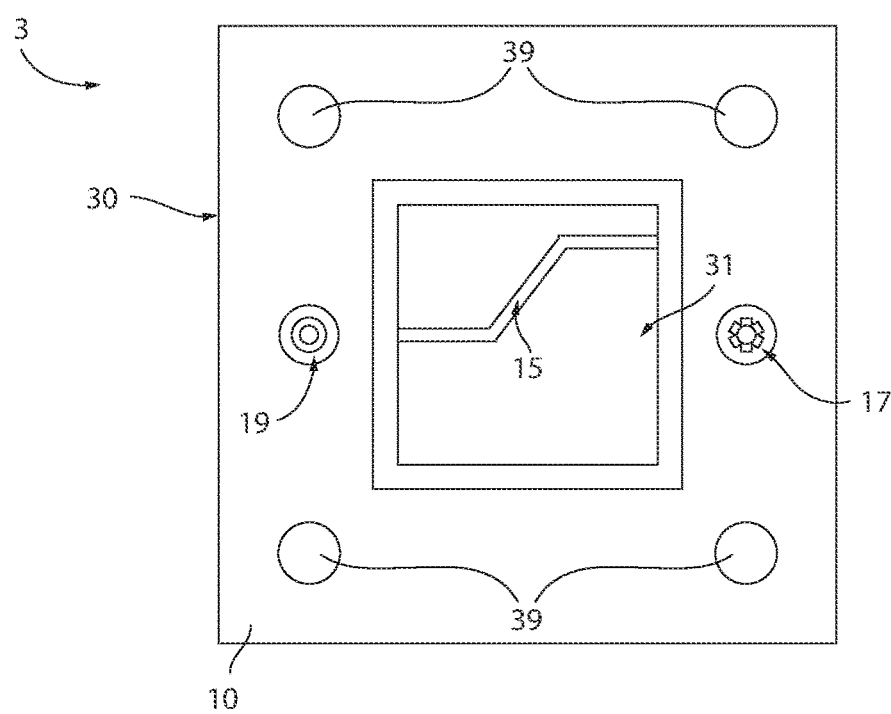
FIG. 9 shows a detail of the portion of FIG. 8, with parts removed for clarity.
Figure 10B:
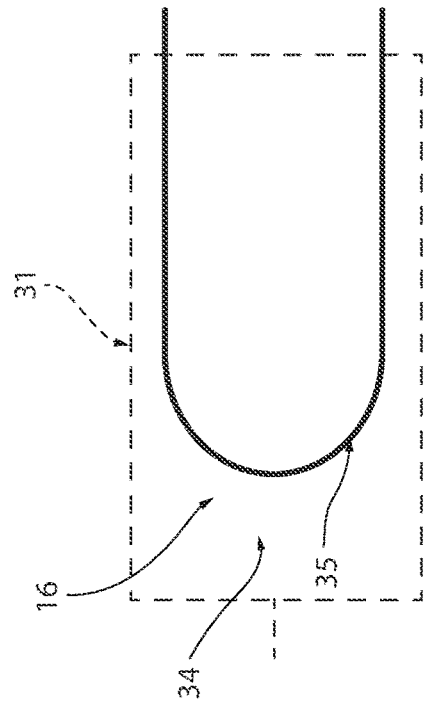
FIGS. 10A to 10E show possible configurations of a detail of the portion of FIG. 4, with parts removed for clarity.
Figure 10D:
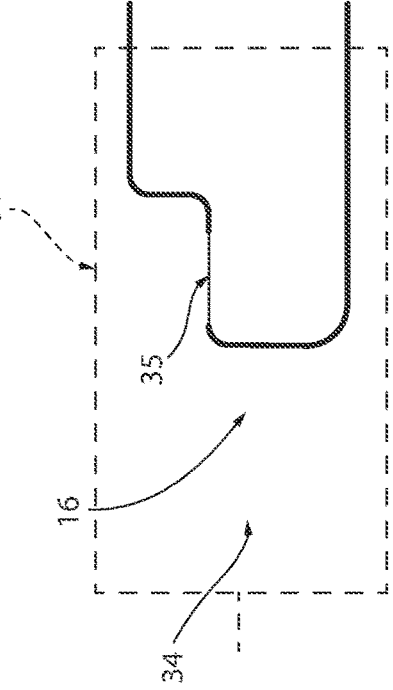
Figure 10A:
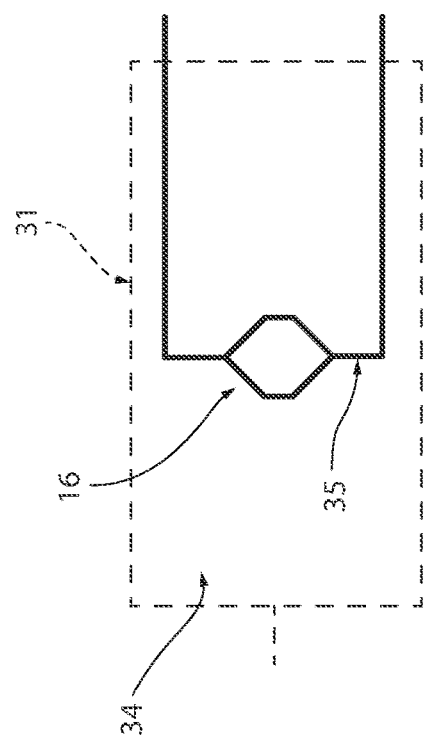
Figure 10C:
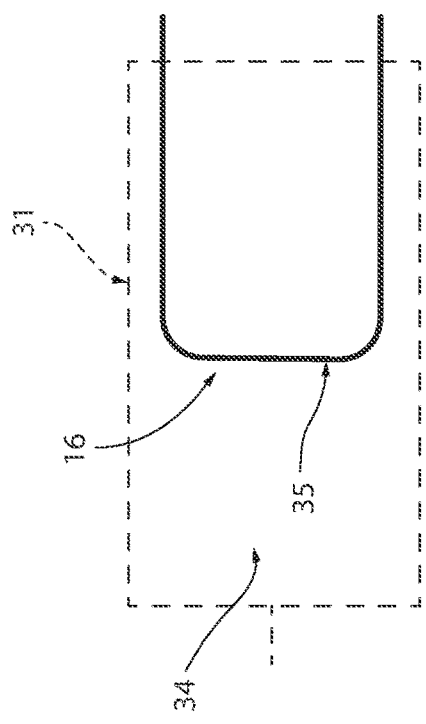

Referring in particular to FIGS. 3B, 8 and 9, also the end module 3 may comprise a respective support mask 30 and a main support 31 with the difference that the main support 31 comprises the connecting conduit 15. Furthermore, the respective first coupling element 35 and the respective third coupling element 38 each comprise a respective portion of the connecting conduit 15 to establish the fluidic connection with the respective first conduit 5 and, respectively, the respective second conduit 6. In particular, the second coupling element 37 of the main support 31 of the end module 3 may present only one structural support functionality.

Referring in particular to FIGS. 1B, 2 and 4 to 9, the LOC device 1 may comprise main fixing means for fixing the base module 2, the analysis module (s) 4 and the end module 3 (and if present the pumping module (s)) to each other.

In the specific case shown, the main fixing means may comprise through holes 39, in particular provided in the base module 2, the analysis module (s) 4 and the end module 3 (and if present in the pumping module (s)), and fixing elements extending through the through holes.

According to some embodiments, the LOC device 1 may also comprise seals arranged for example between the analysis module (s) 4, between the base module 2 and an analysis module 4 or a pumping module and/or between the end module 3 and an analysis module 4.

It should be noted that according to some embodiments, the LOC device 1, in particular the base module 2 and/or the end module 3 and/or the analysis modules 4 and/or the pumping modules, may be made using one or more of the following methods:
manufacturing directly with resins by additive manufacturing (3D printing);
soft lithography;
stereolithography; and
etching techniques.

Figure 11:
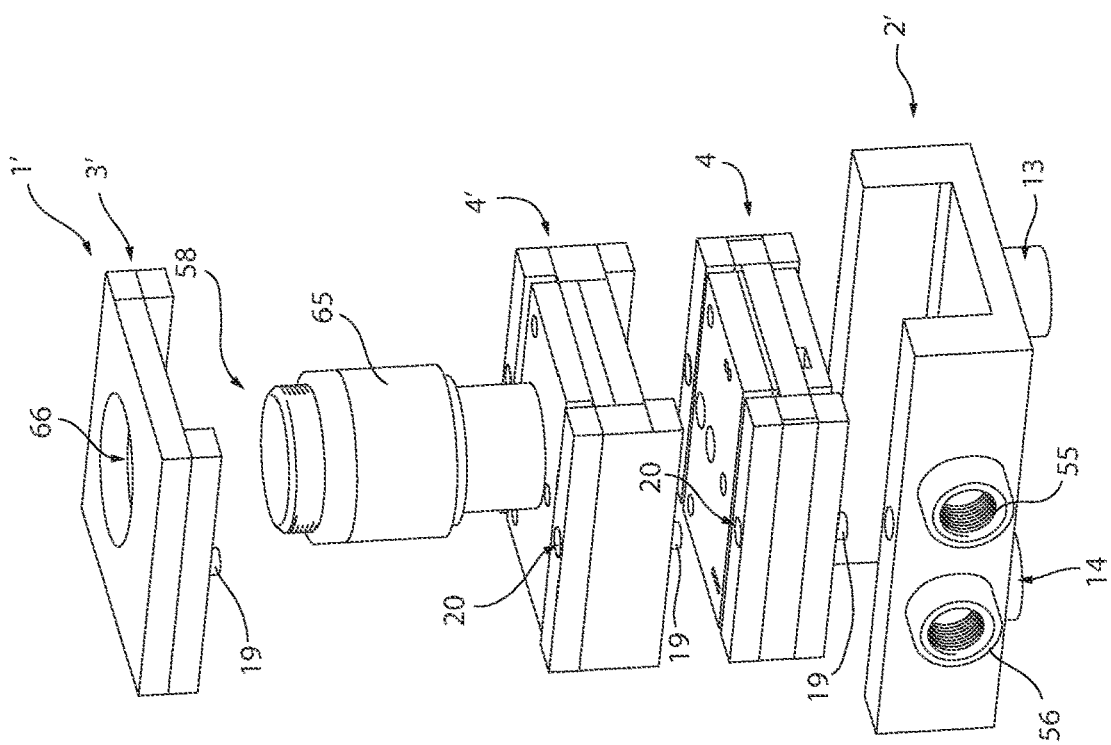
FIG. 11 shows an exploded view of a lab-on-a-chip device according to a second embodiment of the present invention, with parts removed for clarity.
Figure 13:
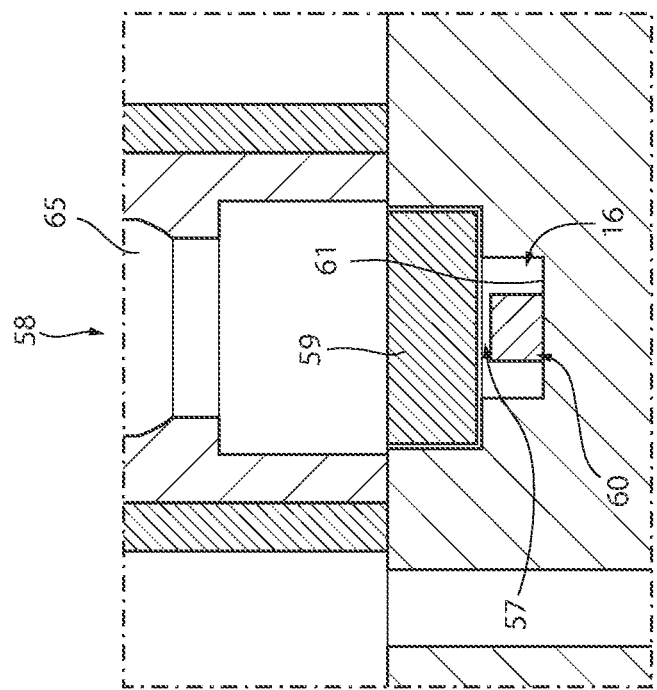
FIG. 13 shows in a section view a portion of the detail of FIG. 12, with parts removed for clarity.
Figure 12:
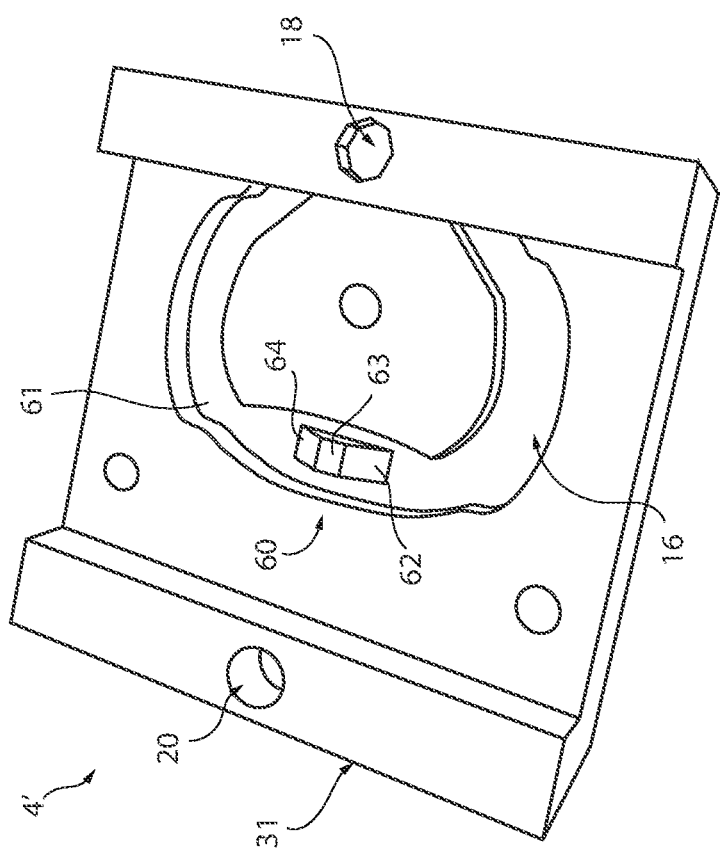
FIG. 12 shows a perspective view of a detail of the lab-on-a-chip device of FIG. 11, with parts removed for clarity.

Referring to FIGS. 11 to 13, number 1' denotes a LOC device according to a second embodiment. The LOC device 1' is similar to the LOC device 1. Hereinafter, the differences between the LOC device 1' and the LOC device 1 are described using the same references for equal or similar parts.

In particular, the LOC device 1' differs from the LOC device 1 in that it comprises the base module 2', the analysis module 4' and the end module 3'.

The base module 2' differs from the base module 2 in that it further comprises a first interface conduit 55 and a second interface conduit 56 configured to be connected to a pump so that the pump can originate and/or control the fluid flow in the fluidic channel 8.

In particular, the first interface conduit 55 may be fluidically connected to the inlet channel 13 and the second interface conduit 56 may be fluidically connected to the first conduit 5 of the base module 2.

The analysis module 4' is configured to allow an optical analysis of the fluid.

As shown in FIG. 11, the LOC device 1' may also comprise an analysis module 4.

In particular, the analysis module 4' may comprise a measurement zone 57 within which the fluid flows, in use, and an optical sensor 58 configured to monitor and/or display the fluid present in the measurement zone 57 and/or acquire images of the measurement zone 57.

Preferably, the measurement zone 57 is made so that the fluid present in the measurement zone 57 is thinned so as to allow a more accurate measuring, in particular through an increase in optical sorting.

In more detail, the respective analysis conduit 16 of the analysis module 4' comprises the measurement zone 57.

In addition, the analysis module 4' may also comprise a window 59 configured to define, together with a portion of the analysis conduit 16, the measurement zone 57. In particular, the window 59 (see FIG. 12) may be configured to allow the optical sensor 58 to monitor and/or display and/or acquire images of the measurement zone 57 through the window 59.

Referring in particular to FIGS. 12 and 13, the analysis module 4' further comprises a restriction element 60 positioned in the analysis conduit 16 at the measurement zone 57 and configured to narrow a transversal section of the analysis conduit 16 at the measurement zone 57.

In particular, the restriction element 60 may protrude from a bottom 61 of the analysis conduit 16 and towards the window 59. Preferably, the restriction element 60 may be integral with the bottom 61.

More specifically, the restriction element 60 may be configured to thin the fluid in the measurement zone 57, in particular allowing for an increase in optical sorting in the measurement zone 57.

The analysis conduit 16 may comprise an inlet for the fluid and an outlet for the fluid; the analysis conduit 16 is configured to allow a flow of the fluid from the inlet to the outlet.

The restriction element 60 may comprise a first ramp 62 and a main plateau 63 facing the window 59. The optical sensor 58 may preferably be configured to monitor and/or display and/or acquire images of the fluid flowing, in use, along the main plateau 63.

Advantageously, the restriction element 60 may also comprise a second ramp 64. In particular, the main plateau 63 may be interposed between the first ramp 62 and the second ramp 64.

Preferably, the first ramp 62 may be fluidically arranged upstream of the main plateau 63 (with respect to the flow of fluid from the inlet to the outlet). In addition, the second ramp 64 may be fluidically arranged downstream of the main plateau 63.

Advantageously, the first ramp 62, and in particular also the second ramp 64, is/are tilted with respect to the main plateau 63.

In further detail, each of the first ramp 62 and the second ramp 64 may comprise a respective first end portion in contact with the bottom 61 and a second end portion connected to the main plateau 63.

Referring in particular to FIG. 11, the optical sensor may comprise an optical unit 65 coupled to the analysis module 4' and a sensor, such as a camera, photoresistor, photodiode or the like, to acquire images and/or optical signals.

The LOC device 1' may also comprise a computing unit configured to analyse the images and/or optical signals acquired by the sensor, in particular to determine the particle characteristics present in the fluid.

The end module 3' differs from the end module 3 in that it comprises an opening 66 to allow the passage of the optical unit 65.

Examining the characteristics of the LOC device 1 or 1' according to the present invention, the advantages which it allows to obtain are clear.

In particular, the LOC device 1 or 1' may be adapted to the specific conditions and the specific measurements to be made by choosing the number of analysis modules 4 and the respective sensor units 12. In other words, the LOC device 1 or 1' is easily customisable.

A further advantage lies in that measuring can be done in real time.

In addition, the LOC device 1 or 1' may also be used in limited spaces.

A further advantage lies in that in-situ analyses can be carried out.

An advantage also results from the possibility of determining a plurality of fluid characteristics.

Moreover, the LOC device 1 or 1' may be used to ensure a reduction in machine downtime and/or an optimisation of a maintenance programme and/or to maximise return on investment (ROI) and/or increase sustainability by minimising wastes, for instance of a lubricating fluid.

Another advantage lies in the possibility of remotely controlling the LOC device 1 or 1'. It is thereby possible to avoid the presence of operators on site.

It is finally clear that modifications and variations can be made to the LOC device 1 or 1' herein described and shown without thereby departing from the scope of protection defined by the claims.

According to other non-limiting embodiments, the fluid may be a liquid from a living organism such as blood, urine or the like.

According to some embodiments, the LOC device 1 may include the base module 2' and/or the analysis module 4'.

According to some embodiments, the analysis module 4' could comprise further main portions 35. For example, the analysis module 4' could present a configuration like the one of the solution of FIG. 10E.

The invention claimed is:

1. Modular lab-on-a-chip device (1, 1') for the analysis of a fluid, comprising at least:
a base module (2, 2');
an end module (3, 3'); and
one or more analysis modules (4, 4') interposed between the base module (2, 2') and the end module (3, 3') and being arranged in sequence between one another;
wherein each one of the base module (2, 2'), the end module (3, 3') and the analysis module (4, 4') comprises a respective first conduit (5) and a respective second conduit (6);
wherein the first conduits (5) define at least partially a first portion (7) of a fluidic channel (8) of the modular lab-on-a-chip device (1, 1') and the second conduits (6) define at least partially a second portion (9) of the fluidic channel (8);
wherein the base module (2, 2') comprises an inlet channel (13) fluidically connected to the respective first conduit (5) for allowing the inlet of the fluid within the modular lab-on-a-chip device (1, 1') and at least an outlet channel (14) fluidically connected to the respective second conduit (6) for allowing the discharging of the fluid from the modular lab-on-a-chip device (1, 1');
wherein the end module (3, 3') comprises a connecting conduit (15) being in fluidic connection with the respective first conduit (5) and the respective second conduit (6) and connecting the first portion (7) and the second portion (9) of the fluidic channel (8) with one another;
wherein each analysis module (4, 4') comprises a respective analysis conduit (16) being in fluidic connection with the respective first conduit (5) for receiving at least a portion of the fluid and a sensor unit (12) configured to determine at least one characteristics of the fluid and/or of one or more components present within the fluid when the fluid is present, in use, within the analysis conduit (16).

2. Device according to claim 1, further comprising a plurality of first connecting elements (17), each one having a respective first channel (18) and a plurality of second connecting elements (19) each one having a respective second channel (20);
wherein each first connecting element (17) is arranged between two respective first conduits (5) such that the respective first channel (5) establishes a fluidic connection between the respective first conduits (5); and
wherein each second connecting element (19) is arranged between two respective second conduits (6) such that the respective second channel (20) establishes a fluidic connection between the respective two second conduits (6).

3. Device according to claim 2, wherein each analysis module (4, 4') and/or the end module (3, 3') comprises at least:
a respective first connecting element (17), the respective first channel (18) being in fluidic connection with the respective first conduit (5); and
a respective second connecting element (19), the respective second channel (20) being in fluidic connection with the respective second conduit (6).

4. Device according to claim 2, wherein each first connecting element (17) extends along a first longitudinal axis (B) and each second connecting element (19) extends along a second longitudinal axis (C);
wherein each first connecting element (17) presents a transversal section with respect to a section plane perpendicular to the respective first longitudinal axis (B), which equals the respective transversal sections of the other first connecting elements (17);
wherein each second connecting element (19) presents a transversal section with respect to a section plane perpendicular to the respective second longitudinal axis (C), which equals the respective transversal sections of the other second connecting elements (19);
wherein the respective transversal sections of the first connecting elements (17) and the respective transversal sections of the second connecting elements (19) are different from one another.

5. Device according to claim 2, wherein each first connecting element (17) is inserted at least into one respective first seat (21) delimiting at least partially one respective first conduit (5); and
wherein each second connecting element (19) is inserted within a respective second seat (22) delimiting at least partially one respective second conduit (6).

6. Device according to claim 5, wherein each first seat (21) and the respective first connecting element (17) are complementary to one another; and each second seat (22) and the respective second connecting element (19) are complementary to one another.

7. Device according to claim 5, wherein each first seat (21) presents a transversal section equaling the transversal sections of the other first seats (21);

wherein each second seat (22) presents a transversal section equaling the transversal sections of the other second seats (22);

wherein the respective transversal sections of the first seats (21) are different from the respective transversal sections of the second seats (22).

8. Device according to claim 2, wherein the base module (2, 2') is void of a first connecting element (17) and void of a second connecting element (18);

wherein each first connecting element (17) and each second connecting element (19) protrudes from the respective analysis module (4, 4') or the respective end module (3, 3') towards the base module (2, 2').

9. Device according to claim 1, wherein each first conduit (5) of each analysis module (4, 4') comprises a first conduit portion (26) and a second conduit portion (27);

wherein the respective analysis conduit (16) fluidically connects the respective first conduit portion (26) and the respective second conduit portion (27).

10. Device according to claim 1, wherein each analysis module (4, 4') comprises a support mask (30) having the respective first conduit (5) and the respective second conduit (6) and a main support (31) having the respective analysis conduit (16);

wherein the support mask (30) comprises a first inner housing seat housing the respective main support (31) and one second internal housing seat (33) housing the respective sensor unit (12).

11. Device according to claim 10, wherein each support mask (30) comprises a plurality of structural layers stacked on top of each other.

12. Device according to claim 10, wherein each main support (31) comprises at least:

a main zone (34) having a main portion (35) of the analysis conduit (16);

a first coupling element (36) protruding from the main zone (34) and having a first auxiliary portion of the analysis conduit (16) for feeding the fluid from the respective first conduit (5) to the respective main portion (35); and a second coupling element (37) protruding from the main zone (34) and having a second auxiliary portion of the analysis conduit (16) for receiving the fluid from the main portion (35) and to feed the fluid to the respective first conduit (5).

13. Device according to claim 12, wherein each support mask (30) comprises a first slot and a second slot housing respectively the first coupling element (36) and the second coupling element (37).

14. Device according to claim 1, further comprising a pump so as to determine a flow of the fluid within the fluidic channel (8).

15. Device according to claim 14, wherein the pump is externally placed from the base module (2, 2'), the end module (3, 3') and the one or more analysis modules (4, 4') and is fluidically connected to the inlet channel (13) and/or the outlet channel (14); and/or the modular lab-on-a-chip device (1, 1') comprises a pumping module being in contact with the base module (2, 2') and being interposed between the base module (2, 2') and an analysis module (4, 4'), the pumping module comprising the pump.

16. Device according to claim 1 and comprising an analysis module having:

an analysis conduit (16) configured to receive the fluid;

a window (59) configured to define, together with a portion of the analysis conduit (16), a measurement zone (57) of the analysis conduit (16) itself; and a restriction element (60) positioned in the analysis conduit (16) at the measurement zone (57) and configured to restrict a cross section of the analysis conduit (16) at the measurement zone (57).

* * * * *